(12) United States Patent
Tanii

(10) Patent No.: US 7,602,534 B2
(45) Date of Patent: Oct. 13, 2009

(54) INTERFACE CIRCUIT DEVICE AND PRINTING APPARATUS

(75) Inventor: Keiichi Tanii, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 463 days.

(21) Appl. No.: 11/496,591

(22) Filed: Aug. 1, 2006

(65) Prior Publication Data

US 2007/0035422 A1 Feb. 15, 2007

(30) Foreign Application Priority Data

Aug. 1, 2005 (JP) ............................... 2005-222467

(51) Int. Cl.
*H04N 1/36* (2006.01)
(52) U.S. Cl. ..................... 358/421; 340/146.2; 326/40
(58) Field of Classification Search .............. 340/146.2; 326/40; 358/421
See application file for complete search history.

(56) References Cited

U.S. PATENT DOCUMENTS 6,191,683 B1* 2/2001 Nygaard, Jr. ............. 340/146.2
6,605,969 B2* 8/2003 Mikhalev et al. ............ 327/158

FOREIGN PATENT DOCUMENTS

| JP | 5-334206 | 12/1993 |
| JP | 10-171567 | 6/1998 |
| JP | 2002-366107 | 12/2002 |

* cited by examiner

*Primary Examiner*—Twyler L Haskins
*Assistant Examiner*—Michael Burleson
(74) *Attorney, Agent, or Firm*—McDermott Will & Emery LLP

(57) ABSTRACT

A CPU and an image memory are provided in a printing apparatus. An interface circuit device for inputting/outputting signals representing image data is interposed between the CPU and the image memory. The interface circuit device constitutes of a plurality of SSTL circuits. One of two adjoining pixels in image data is changed into a non-inverted pixel, and the other is changed into an inverted pixel. In the SSTL circuits, to which inputted is a signal representing the one pixel, an input signal is inputted so as not to invert an input signal. In the SSTL circuits, to which inputted is a signal representing the other pixel as an inverted element, an input signal is inputted to the inverted element so as to invert an input signal. This suppresses an increase in cost and an increase in the size of a device, while reducing the current in impedance matching.

7 Claims, 9 Drawing Sheets

FIG. 3

| | 0000 | 0001 | 0010 | 0011 | 0100 | 0101 | 0110 | 0111 | 1000 | 1001 | 1010 | 1011 | 1100 | 1101 | 1110 | 1111 |
|---|---|---|---|---|---|---|---|---|---|---|---|---|---|---|---|---|
| 0000 | 8 | 7 | 7 | 6 | 7 | 6 | 6 | 5 | 7 | 6 | 6 | 5 | 6 | 5 | 5 | 4 |
| 0001 | 7 | 6 | 6 | 5 | 6 | 5 | 5 | 4 | 6 | 5 | 5 | 4 | 5 | 4 | 4 | 3 |
| 0010 | 7 | 6 | 6 | 5 | 6 | 5 | 5 | 4 | 6 | 5 | 5 | 4 | 5 | 4 | 4 | 3 |
| 0011 | 6 | 5 | 5 | 4 | 5 | 4 | 4 | 3 | 5 | 4 | 4 | 3 | 4 | 3 | 3 | 2 |
| 0100 | 7 | 6 | 6 | 5 | 6 | 5 | 5 | 4 | 6 | 5 | 5 | 4 | 5 | 4 | 4 | 3 |
| 0101 | 6 | 5 | 5 | 4 | 5 | 4 | 4 | 3 | 5 | 4 | 4 | 3 | 4 | 3 | 3 | 2 |
| 0110 | 6 | 5 | 5 | 4 | 5 | 4 | 4 | 3 | 5 | 4 | 4 | 3 | 4 | 3 | 3 | 2 |
| 0111 | 5 | 4 | 4 | 3 | 4 | 3 | 3 | 2 | 4 | 3 | 3 | 2 | 3 | 2 | 2 | 1 |
| 1000 | 7 | 6 | 6 | 5 | 6 | 5 | 5 | 4 | 6 | 5 | 5 | 4 | 5 | 4 | 4 | 3 |
| 1001 | 6 | 5 | 5 | 4 | 5 | 4 | 4 | 3 | 5 | 4 | 4 | 3 | 4 | 3 | 3 | 2 |
| 1010 | 6 | 5 | 5 | 4 | 5 | 4 | 4 | 3 | 5 | 4 | 4 | 3 | 4 | 3 | 3 | 2 |
| 1011 | 5 | 4 | 4 | 3 | 4 | 3 | 3 | 2 | 4 | 3 | 3 | 2 | 3 | 2 | 2 | 1 |
| 1100 | 6 | 5 | 5 | 4 | 5 | 4 | 4 | 3 | 5 | 4 | 4 | 3 | 4 | 3 | 3 | 2 |
| 1101 | 5 | 4 | 4 | 3 | 4 | 3 | 3 | 2 | 4 | 3 | 3 | 2 | 3 | 2 | 2 | 1 |
| 1110 | 5 | 4 | 4 | 3 | 4 | 3 | 3 | 2 | 4 | 3 | 3 | 2 | 3 | 2 | 2 | 1 |
| 1111 | 4 | 3 | 3 | 2 | 3 | 2 | 2 | 1 | 3 | 2 | 2 | 1 | 2 | 1 | 1 | 0 |

FIG. 4

| | 0000 | 0001 | 0010 | 0011 | 0100 | 0101 | 0110 | 0111 | 1000 | 1001 | 1010 | 1011 | 1100 | 1101 | 1110 | 1111 |
|---|---|---|---|---|---|---|---|---|---|---|---|---|---|---|---|---|
| 0000 | 4 | 5 | 5 | 6 | 5 | 6 | 6 | 7 | 5 | 6 | 6 | 7 | 6 | 7 | 7 | 8 |
| 0001 | 3 | 4 | 4 | 5 | 4 | 5 | 5 | 6 | 4 | 5 | 5 | 6 | 5 | 6 | 6 | 7 |
| 0010 | 3 | 4 | 4 | 5 | 4 | 5 | 5 | 6 | 4 | 5 | 5 | 6 | 5 | 6 | 6 | 7 |
| 0011 | 2 | 3 | 3 | 4 | 3 | 4 | 4 | 5 | 3 | 4 | 4 | 5 | 4 | 5 | 5 | 6 |
| 0100 | 3 | 4 | 4 | 5 | 4 | 5 | 5 | 6 | 4 | 5 | 5 | 6 | 5 | 6 | 6 | 7 |
| 0101 | 2 | 3 | 3 | 4 | 3 | 4 | 4 | 5 | 3 | 4 | 4 | 5 | 4 | 5 | 5 | 6 |
| 0110 | 2 | 3 | 3 | 4 | 3 | 4 | 4 | 5 | 3 | 4 | 4 | 5 | 4 | 5 | 5 | 6 |
| 0111 | 1 | 2 | 2 | 3 | 2 | 3 | 3 | 4 | 2 | 3 | 3 | 4 | 3 | 4 | 4 | 5 |
| 1000 | 3 | 4 | 4 | 5 | 4 | 5 | 5 | 6 | 4 | 5 | 5 | 6 | 5 | 6 | 6 | 7 |
| 1001 | 2 | 3 | 3 | 4 | 3 | 4 | 4 | 5 | 3 | 4 | 4 | 5 | 4 | 5 | 5 | 6 |
| 1010 | 2 | 3 | 3 | 4 | 3 | 4 | 4 | 5 | 3 | 4 | 4 | 5 | 4 | 5 | 5 | 6 |
| 1011 | 1 | 2 | 2 | 3 | 2 | 3 | 3 | 4 | 2 | 3 | 3 | 4 | 3 | 4 | 4 | 5 |
| 1100 | 2 | 3 | 3 | 4 | 3 | 4 | 4 | 5 | 3 | 4 | 4 | 5 | 4 | 5 | 5 | 6 |
| 1101 | 1 | 2 | 2 | 3 | 2 | 3 | 3 | 4 | 2 | 3 | 3 | 4 | 3 | 4 | 4 | 5 |
| 1110 | 1 | 2 | 2 | 3 | 2 | 3 | 3 | 4 | 2 | 3 | 3 | 4 | 3 | 4 | 4 | 5 |
| 1111 | 0 | 1 | 1 | 2 | 1 | 2 | 2 | 3 | 1 | 2 | 2 | 3 | 2 | 3 | 3 | 4 |

INTERFACE CIRCUIT DEVICE AND PRINTING APPARATUS

BACKGROUND OF THE INVENTION

1. Field of the Invention

The present invention relates to a technique of suppressing the heat generation of a power supply while suppressing an increase in cost, when performing an impedance matching of input/output signals.

2. Description of the Background Art

Speeding up of a memory bus and the like has created the need for strict realization of impedance matching on input/output sides with respect to the wiring of a mounted substrate. Conventionally, to this end, an interface circuit that is for example called SSTL (stub series terminated logic) is defined.

FIG. 9 is a circuit diagram of an SSTL circuit 100 that is a general SSTL2. The SSTL circuit 100 consists mainly of an output driver 101, a receiver 102, and resistors 103, 104, and 105. An electric signal indicating data is inputted to the output driver 101, and a reference voltage V0 is applied from a power supply 106.

A comparison voltage V1 is applied to the receiver 102 by a power supply 107. The SSTL circuit 100 is a circuit that compares an input signal and the comparison voltage V1, and outputs an output signal based on the result of the comparison (i.e., large or small).

Description will now be made of the case of designing so that the reference voltage V0 and the comparison voltage V1 are 1.25 V each, the resistor 103 is 22Ω, the resistors 104 and 105 are 50Ω each, and the characteristic impedance of the mounted substrate is 50Ω.

The input voltage on the receive side of the receiver 102 is generally approximately the reference voltage V0 plus 0.8 V or minus 0.8V. From the power supply 106, a current I of 0.8/(50/2)=32 mA is supplied to the SSTL circuit 100.

Consider a case where the above-mentioned SSTL circuit 100 is used for the input/output of a DIMM memory in general use. This DIMM memory is 64 bits or more, and requires about a hundred SSTL circuits 100 because there are many address buses and other control lines.

On the other hand, on the SSTL circuit 100, a current I is supplied from the power supply 106 when inputting/outputting a low level, and the current I is absorbed toward the power supply 106 when inputting/outputting a high level. Accordingly, the current I of the power supply 106 becomes a maximum when all of the SSTL circuits 100 input/output the same level signals. In the DIMM memory in general use under the conditions described here, its maximum current is 32×100=3.2 A, and hence the heat generation of the power supply 106 is a serious problem.

To solve this problem, it can be considered to dispose such a power circuit (of regular system, etc.) that can cope with a large current. However, this is costly and also the device is scaled up.

Japanese Patent Application Laid-Open No. 10-171567 (1998) proposes a technique of reducing electric power by bit inversion. In accordance with the technique described in this publication, inverting circuits are provided every other one bit, so that the outputs of two adjoining impedance matching circuits are different levels from each other (one is a high level, and the other is a low level). With this construction, the current absorbed from the circuit outputting the high level to the power supply can be supplied to the circuit outputting the low level, making it possible to reduce the current that flows into the power supply.

The technique described in the above publication is effective when two adjoining impedance matching circuits output the same level signal. However, when the levels of adjoining signals are originally different, the signal inversion may conversely increase current.

In fact, it is therefore necessary to determine the level of a signal, and make a determination whether the signal should be inverted or not. This requires a determination circuit therefor and wiring for switching between inversion and non-inversion. It is however impossible to add wiring for switching in the input/output with respect to a memory.

SUMMARY OF THE INVENTION

The present invention is directed to a technique of suppressing the heat generation of a power supply while suppressing an increase in cost, when performing an impedance matching of input/output signals.

In one preferred embodiment of the present invention, an interface circuit device to perform input/output of a signal representing image data includes: a plurality of circuits electrically connected to a reference power circuit so as to perform impedance matching of a signal; and an output element that inverts an input signal representing only one of two adjoining pixels in a predetermined scanning direction on an image represented by image data sequentially scanned in a predetermined direction in image data, into an inverted pixel, and inverts an input signal representing the inverted pixel to obtain an output signal.

With this construction, the current can be reduced without the use of a determination circuit and wring for switching. This permits a reduction in the cost of a reference power, and also suppresses an increase in the size of a device.

Preferably, the output element of the interface circuit device includes an acquiring element to acquire a bit number constituting one pixel; a plurality of signal inverting elements corresponding to the plurality of circuits, respectively; and a control element that, based on the bit number acquired by the acquiring element, specifies a circuit to which an input signal representing the pixel to be inverted is inputted from the plurality of circuits, and allows only a signal inverting element corresponding to the circuit specified to invert an input signal.

This enables to comply with variation in a bit number representing a pixel.

Further, the present invention is applicable to a printing apparatus including: a printing part for printing an image on paper based on image data; and an interface circuit device for performing input/output of a signal representing image data. The interface circuit device includes a plurality of circuits electrically connected to a reference power circuit so as to perform impedance matching of a signal; and an output element that inverts an input signal representing only one of two adjoining pixels in a predetermined scanning direction on an image represented by image data to obtain an output signal.

Accordingly, the present invention has for its object to suppress an increase in cost and an increase in the size of a device, while reducing the current in impedance matching.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram showing the number of low level signals in a combination of a pixel P1 and a pixel P2;

FIG. 4 is a diagram showing the number of low levels in signals OS1 to OS8 of the interface circuit device, in a combination of a pixel P1 and a pixel P2;

DESCRIPTION OF THE PREFERRED EMBODIMENTS

Figure 1:
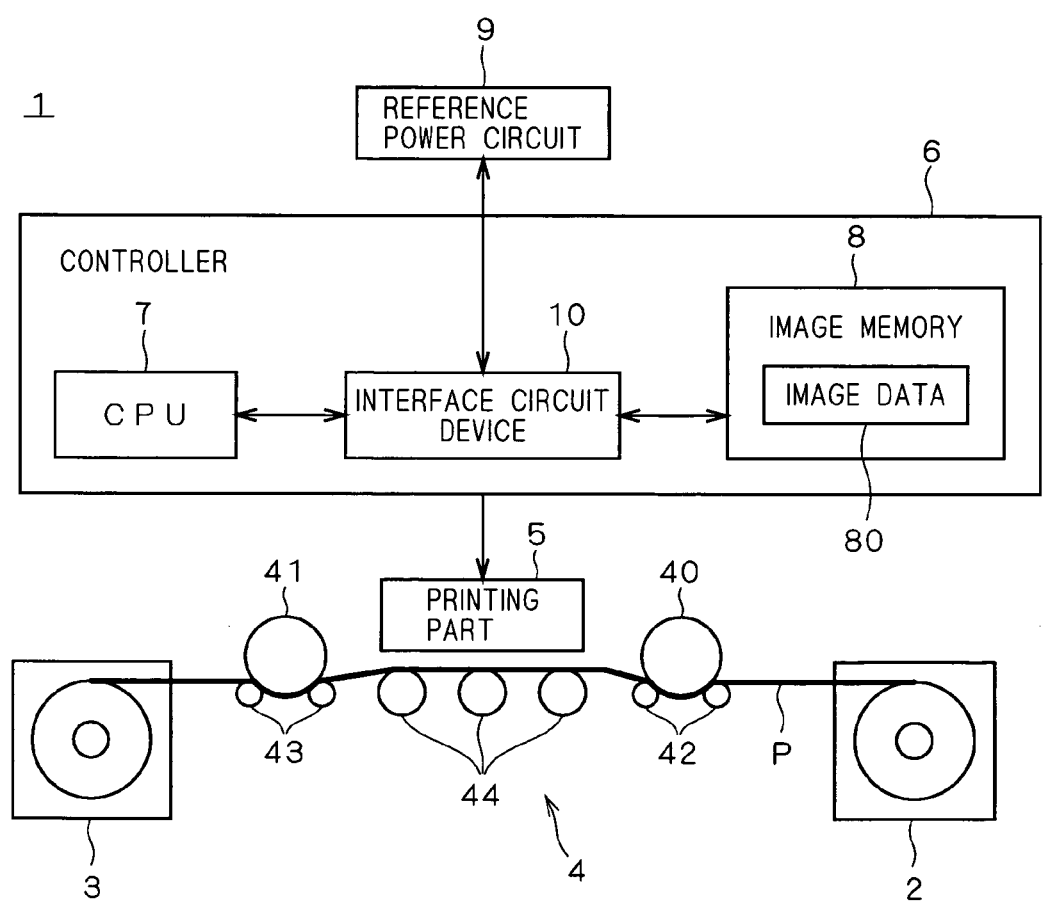
FIG. 1 is a diagram showing a printing apparatus according to one preferred embodiment of the present invention.

FIG. 1 is a diagram showing a printing apparatus 1 according to the present invention. The printing apparatus 1 has a paper feeding part 2, a winding part 3, a conveying part 4, a printing part 5, and a controller 6, and performs printing onto a long rolled paper P, based on image data 80.

The paper feeding part 2, to which an unused rolled paper P is set in the shape of a roll, feeds sequentially the set rolled paper P to the printing part 5. The winding part 3 recovers the rolled paper P after being subjected to printing, and winds it in the shape of a roll. The rolled paper P wound around the winding part 3 will be then carried out to the outside of the apparatus by an operator, or the like.

The conveying part 4 has an infeed roller 40, an outfeed roller 41, nip rollers 42 and 43, and conveying rollers 44.

The infeed roller 40 is disposed on the upstream side of the printing part 5, and conveys the rolled paper P fed from the paper feeding part 2 to the printing part 5. On the other hand, the outfeed roller 41 is disposed on the downstream side of the printing part 5, and conveys the rolled paper P printed by the printing part 5 to the winding part 3.

The nip roller 42 cooperates with the infeed roller 40 to nip the rolled paper P, and the nip roller 43 cooperates with the outfeed roller 41 to nip the rolled paper P. The conveying rollers 44 convey the rolled paper P in the printing part 5.

The printing part 5 performs printing by injecting ink to the rolled paper P, based on the image data 80 transferred from the controller 6. That is, the printing apparatus 1 has the function of a so-called ink-jet printer. It should be noted that the technique of performing printing on the rolled paper P is not limited to ink-jet system, and it may be thermal transfer system, toner system, or the like.

The controller 6 has a CPU 7, an image memory 8, a reference power circuit 9, and an interface circuit device 10.

The CPU 7 operates under a program to thereby perform operation of data and control the respective configurations of the printing apparatus 1. Particularly, when the CPU 7 has the image memory 8 store the image data 80, it outputs a signal representing the image data 80 to the image memory 8 via the interface circuit device 10. When the CPU 7 has the printing part 5 print the image data 80, it reads the image data 80 from the image memory 8 via the interface circuit device 10.

The image memory 8 is a general DIMM memory, and connected to the CPU 7 by bus wiring. The image memory 8 is used to store the image data 80, based on which the printing apparatus 1 performs printing.

The reference power circuit 9 has the function of passing current, which is required for the execution of impedance matching, to the interface circuit device 10. In an SSTL circuit, when outputting a low level, current flows from the connected reference power circuit (hereinafter referred to as "supply of current"), and when outputting a high level, current flows to the reference power circuit (hereinafter referred to as "absorption of current"). The current absorbed from the SSTL circuit that outputs a high level flows to an SSTL circuit that requires the supply of current (namely a circuit that outputs a low level), so that this current does not flow to the reference power circuit (This phenomenon is called "counteraction of current"). Therefore, in the interface circuit device 10, only not-counteracted current will flow into the reference-power circuit 9.

Figure 2:
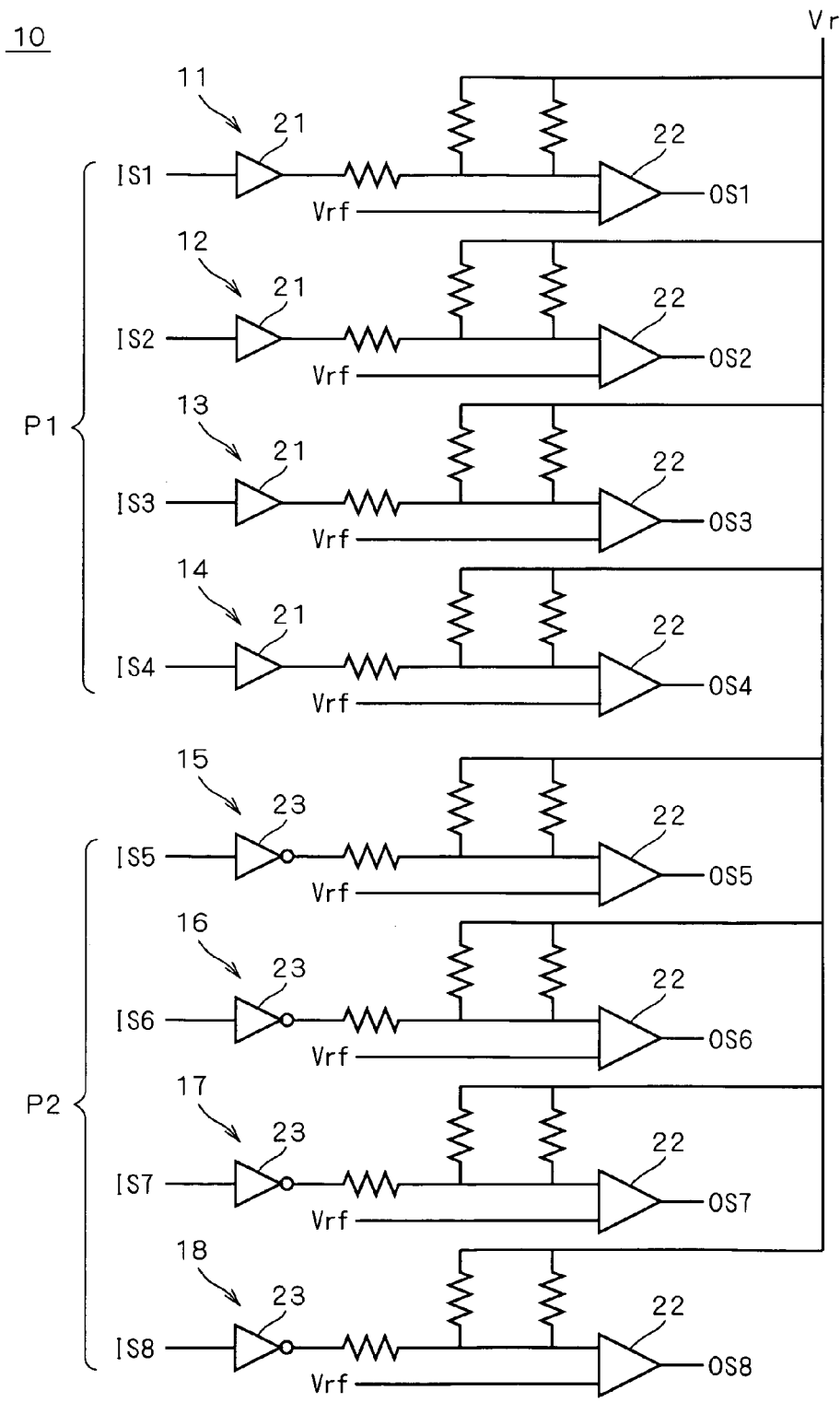
FIG. 2 is a diagram showing an interface circuit device in a first preferred embodiment.

FIG. 2 is a diagram showing the interface circuit device 10 in a first preferred embodiment. The interface circuit device 10 has SSTL circuits, the number of which corresponds to the bit number of the bus of the image memory 8 (about 100 in number). Among these, only eight SSTL circuits 11 to 18 are shown in FIG. 2. That is, in the interface circuit device 10, the eight SSTL circuits 11 to 18 are configured as an effective unit block. FIG. 2 shows only one unit block. Similarly, only eight SSTL circuits are illustrated in other preferred embodiments.

A voltage Vr is applied to the interface circuit device 10 by the reference power circuit 9, allowing current to be supplied to (or absorbed by) the respective SSTL circuits 11 to 18.

Signals IS1 to IS8 are part of signals representing the image data 80, whose storage into the image memory 8 is directed by the CPU 7. The signals IS1 to IS4 are signals indicating the digits when a pixel P1 constituting the image data 80 is represented by four bits, and the signals IS5 to IS8 are signals indicating the digits when a pixel P2 constituting the image data 80 is represented by four bits.

The pixel P1 and the pixel P2 are adjoining pixels in line data that represent one line of the image data 80. In other words, they are contiguous pixels when the image data 80 is sequentially scanned in the direction of the line.

In the preferred embodiment, on the assumption that the Mth pixel in line data is a pixel P (M), a pixel P (2N−1) is changed into a non-inverted pixel, and a pixel P (2N) is changed into an inverted pixel, wherein N is a natural number. This is equal to alternately change pixels sequentially scanned when scanning the image data 80 in the direction of the line, into an inverted pixel. This enables the printing apparatus 1 to easily distinguish the inverted pixels. As will be described later in detail, the signal representing the inverted pixel P (2N−1) is inputted to a non-inverting element 21, and the signal representing the inverted pixel P (2N) is inputted to an inverting element 23.

Signals OS1 to OS8, which are signals outputted by the SSTL circuits 11 to 18, are outputted to the image memory 8. In other words, the interface circuit device 10 is a device that converts the input signals from the CPU 7 (the signals IS1 to IS8) into output signals (the signals OS1 to OS8) by a plurality of SSTL circuits (SSTL circuits 11 to 18), and outputs them to the image memory 8.

The SSTL circuits 11 to 18 are circuits of the standard referred to as "SSTL2," each of which functions as an interface circuit corresponding to a signal line. The SSTL circuits 11 to 18 perform noise elimination of signals and impedance matching of input/output circuits.

The SSTL circuits 11 to 14 have the same configuration, each of which has a non-inverting element 21 and a receiver 22. Input to the SSTL circuits 11 to 14 are the signals IS1 to IS4, respectively, which are signals representing the pixel P1. Output from the SSTL circuits 11 to 14 are signals OS1 to OS4, respectively, which are stored in the image memory 8.

The non-inverting element 21 is a so-called buffer gate that outputs the input signals (the signals IS1 to IS4), without inverting them, to the receiver 22. The receiver 22 performs comparison thereof with a reference potential Vrf so as to generate output signals (the signals OS1 to OS4), and outputs them to the image memory 8.

Description will be made with the SSTL circuit 11 as example. When the signal IS1 is inputted to the SSTL circuit 11, the non-inverting element 21 inputs the signal IS1, without inverting its polarity, to the receiver 22. The receiver 22 performs comparison thereof with the reference potential Vrf, and outputs the signal OS1.

Thus, upon input of a low level signal, the SSTL circuits 11 to 14 output a low level signal. Upon input of a high level signal, they output a high level signal. Each of the SSTL circuits 11 to 14 configures a non-inverting type SSTL circuit. Upon input of a low level signal, current is supplied from the reference power circuit 9. Upon input of a high level signal, current is absorbed into the reference power circuit 9.

SSTL circuits 15 to 18 have the same configuration, each of which has an inverting element 23 and a receiver 22. Input to the SSTL circuits 15 to 18 are signals IS5 to IS8, respectively, which are signals representing the pixel P2. Output from the SSTL circuits 15 to 18 are signals OS5 to OS8, respectively, which are stored in the image memory 8.

The inverting element 23 is a so-called inverter that inverts the polarity of input signals (the signals IS5 to IS8), and outputs them to the receiver 22. The receiver 22 performs comparison thereof with the reference potential Vrf so as to generate output signals (the signals OS5 to OS8), and outputs them to the image memory 8.

Description will be made with the SSTL circuit 15 as example. When the signal IS5 is inputted to the SSTL circuit 15, the inverting element 23 inverts the polarity thereof and outputs it to the receiver 22. The receiver 22 performs comparison thereof with the reference potential Vrf, and outputs the signal OS5.

Thus, upon input of a low level signal, the SSTL circuits 15 to 18 output a high level signal. Upon input of a high level signal, they output a low level signal. Each of the SSTL circuits 15 to 18 configures an inverting type SSTL circuit. Upon input of a low level signal, current is absorbed into the reference power circuit 9. Upon input of a high level signal, current is supplied from the reference power circuit 9.

That is, in the SSTL circuits 15 to 18, current is supplied from the reference power circuit 9 to the circuits when the output signals, namely the signals OS1 to OS8, are of a low level, and current is absorbed from the circuits when these signals are of a high level.

In the presence of the above-mentioned interface circuit device 10, if the low level signals are equal in number to that of the high level signals in the output signals OS1 to OS8, the supply of current and the absorption of current are completely counteracted, thereby minimizing the current flowing between the reference power circuit 9 and the interface circuit device 10.

FIG. 3 is a diagram showing the number of low level signals in a combination of the pixel P1 and the pixel P2. FIG. 4 is a diagram showing the number of low levels in the signals OS1 to OS8 of the interface circuit device 10, in the combination of the pixel P1 and the pixel P2.

In FIGS. 3 and 4, the values of the pixel P1 are indicated on the leftmost column, and the values of the pixel P2 are indicated on the top row. Such cells that the former and the latter cross each other indicate the number of zero (represented by a low level signal) in the combination of the former and the latter.

Further in FIGS. 3 and 4, the cells corresponding to a combination, in which the difference between the number of high level signals and the number of low level signals is four or more, are emphasized by hatching.

Specifically, when the value of the pixel P1 is "0000" and the value of the pixel P2 is "0000," the number of low level signals to be inputted is "8." When the number of low level signals is "8," the number of high level signals is "0." Accordingly, the difference therebetween is "8" (namely, not less than four), so that the corresponding cell is hatched.

Further in FIGS. 3 and 4, the cell that the value of the pixel P2 is in the range of plus 1 or minus 1 with respect to the value of the pixel P1 is emphasized by surrounding it with the solid line.

In the image data 80 that represent an image, there is usually the characteristic that the values of adjoining pixels are approximately the same. In the image data 80, except for portions corresponding to the edges of an object, pixels having a relatively similar value are often arranged side by side. Hence, it is probable that the pixels P1 and P2, as the adjoining pixels in the image data 80, appear in a similar value. It can therefore be said that the combinations of the cells surrounded by the solid line in FIGS. 3 and 4 appear frequently.

Referring to FIG. 3, there are 18 combinations emphasized by hatching in the combinations that appear frequently (combinations corresponding to the cells surrounded by the solid line) in the image data 80. In the 18 combinations, "8" is the maximum difference between the number of low level signals and the number of high level signals.

This shows that even for the image data 80 representing an object, such as a picture, the low level signals and the high level signals do not appear equally. In an SSTL circuit without the inverted element 23, as in a conventional device, the level of an input signal and the level of an output signal are equal. Therefore, the situation as shown in FIG. 3 corresponds to combinations of output signals. Hence, it is impossible for the conventional device to suppress the current flowing between a reference power circuit and an interface circuit device.

Whereas in the interface circuit device 10, there are two combinations emphasized by hatching in the frequent combinations, as shown in FIG. 4. This shows a remarkable reduction in the frequency of current (not less than four) flowing between the reference power circuit 9 and the interface circuit device 10. Hence, the interface circuit device 10 in the present preferred embodiment can reduce the frequency of a large current flowing between the reference power circuit 9 and the interface circuit device 10, thereby suppressing the heat generation of the reference power circuit 9.

Further, in the two combinations emphasized by hatching, "4" is the maximum difference between the number of low level signals and the number of high level signals. It can be seen that the use of the interface circuit device 10 decreases the value of the maximum current that usually flows between the reference power circuit 9 and the interface circuit device 10. This also suppresses the heat generation of the reference power circuit 9.

As described above, the printing apparatus 1 of the preferred embodiment determines in advance the SSTL circuits constituting an effective unit block, depending on the bit number for representing each pixel. That is, in the image data 80, the SSTL circuits (the SSTL circuits 11 to 18), to which inputted are signals representing pixels adjoining to each other, are handled as one unit block.

The heat generation of the reference power circuit 9 can be suppressed by providing in advance the inverting element 23 only on the SSTL circuits (the SSTL circuits 15 and 18), to which inputted are signals representing the pixel to be inverted (the pixel P2), in the SSTL circuits 11 to 18 that constitute the one unit block.

In other words, the interface circuit device 10 of the printing apparatus 1 is provided in advance with the inverting element 23 (fixes in hardware manner) in consideration of the characteristics of the pixels in the image data 80. This suppresses the heat generation of the reference power circuit 9 without the use of the determination circuit that determines an input signal each time, and the wiring for switching inversion/non-inversion of signals in response to the result thereof.

In the printing apparatus 1 of the preferred embodiment, the value of the inverted pixel (P2) is stored in its inverted state in the image memory 8. Therefore, when the image data 80 is read, the value of the inverted pixel (P2) is read while being inverted.

One unit block is made up of the SSTL circuits of the number necessary for inputting signals representing two pixels. For example, if one pixel is represented by eight bits, one unit block contains 16 SSTL circuits. That is, the number of the SSTL circuits constituting one unit block is set depending on how many bits is used to represent one pixel. Hence, it is not limited to eight bits, as illustrated in the preferred embodiment.

In the first preferred embodiment, the inverting element 23 is disposed only on the SSTL circuits, to which the signal representing the pixel to be inverted is inputted. Alternatively, every SSTL circuit may be provided with the inverting element 23.

Figure 5:
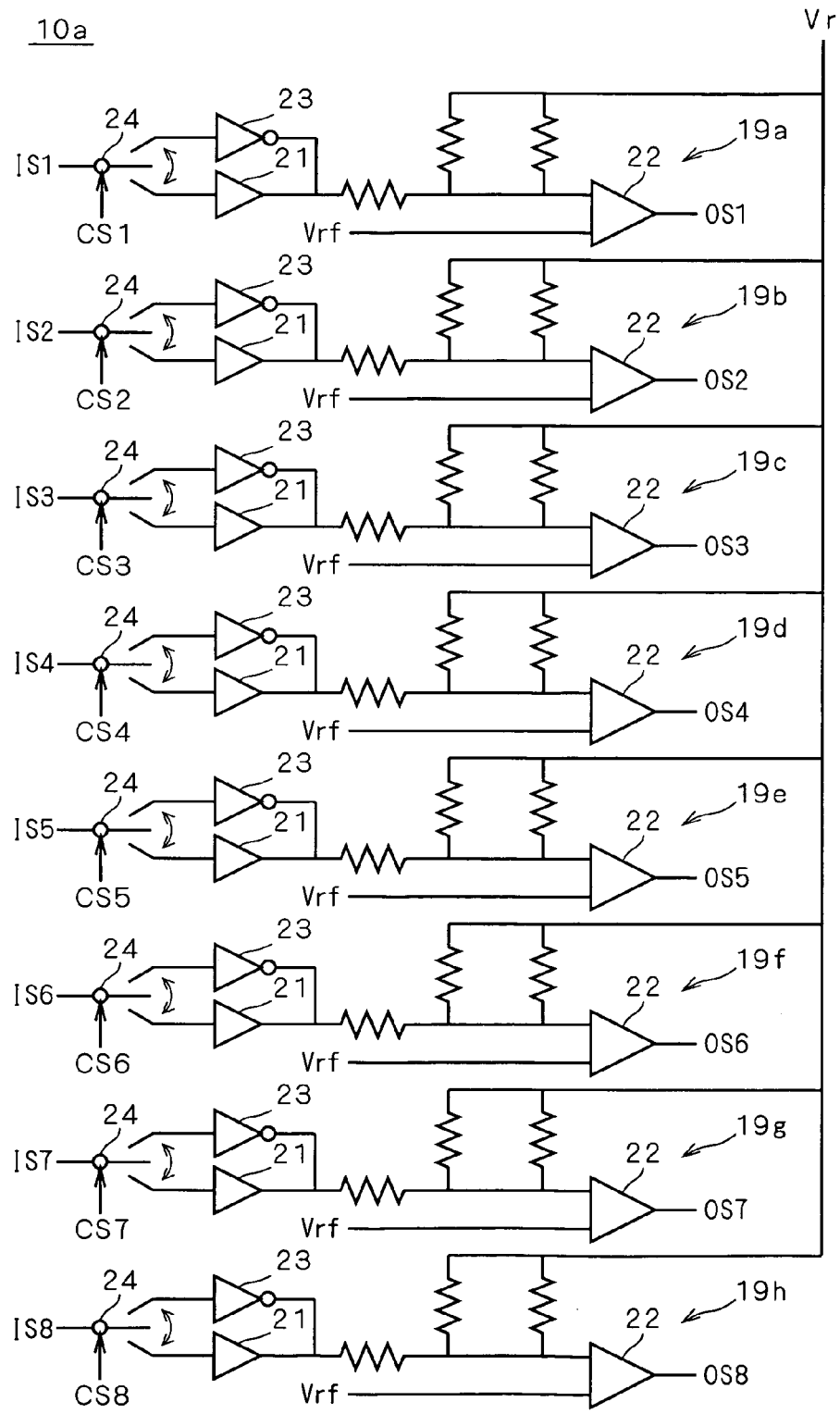
FIG. 5 is a diagram showing an interface circuit device of a printing apparatus in a second preferred embodiment.

FIG. 5 is a diagram showing an interface circuit device 10a of a printing apparatus 1 in a second preferred embodiment. The printing apparatus 1 of the second preferred embodiment is the same as the printing apparatus 1 of the first preferred embodiment, except for the interface circuit device 10a.

The interface circuit device 10a has a plurality of SSTL circuits 19a to 19h, each of which has the same configuration.

Each of the SSTL circuits 19a to 19h is provided with a non-inverting element 21, a receiver 22, and an inverting element 23, and further provided with a switching element 24 for selectively connecting the non-inverting element 21 and the inverting element 23.

Control signals (signals CS1 to CS8) are inputted from the CPU 7 to the switching elements 24, respectively. Based on the control signals, the non-inverting element 21 and the inverting element 23 are selectively connected. For example, the switching element 24 connects the non-inverting element 21 to the circuit when the control signal CS1 is in low level, and connects the inverting element 23 to the circuit when the control signal CS1 is in high level.

The CPU 7 in the second preferred embodiment captures a bit number representing the pixels of the image data 80, based on input information from an operator, and initialization information, and the like. Based on the captured bit number, the CPU 7 selects the inverting element 23 that inverts the polarity of an input signal, and controls the switching element 24.

Figure 6:
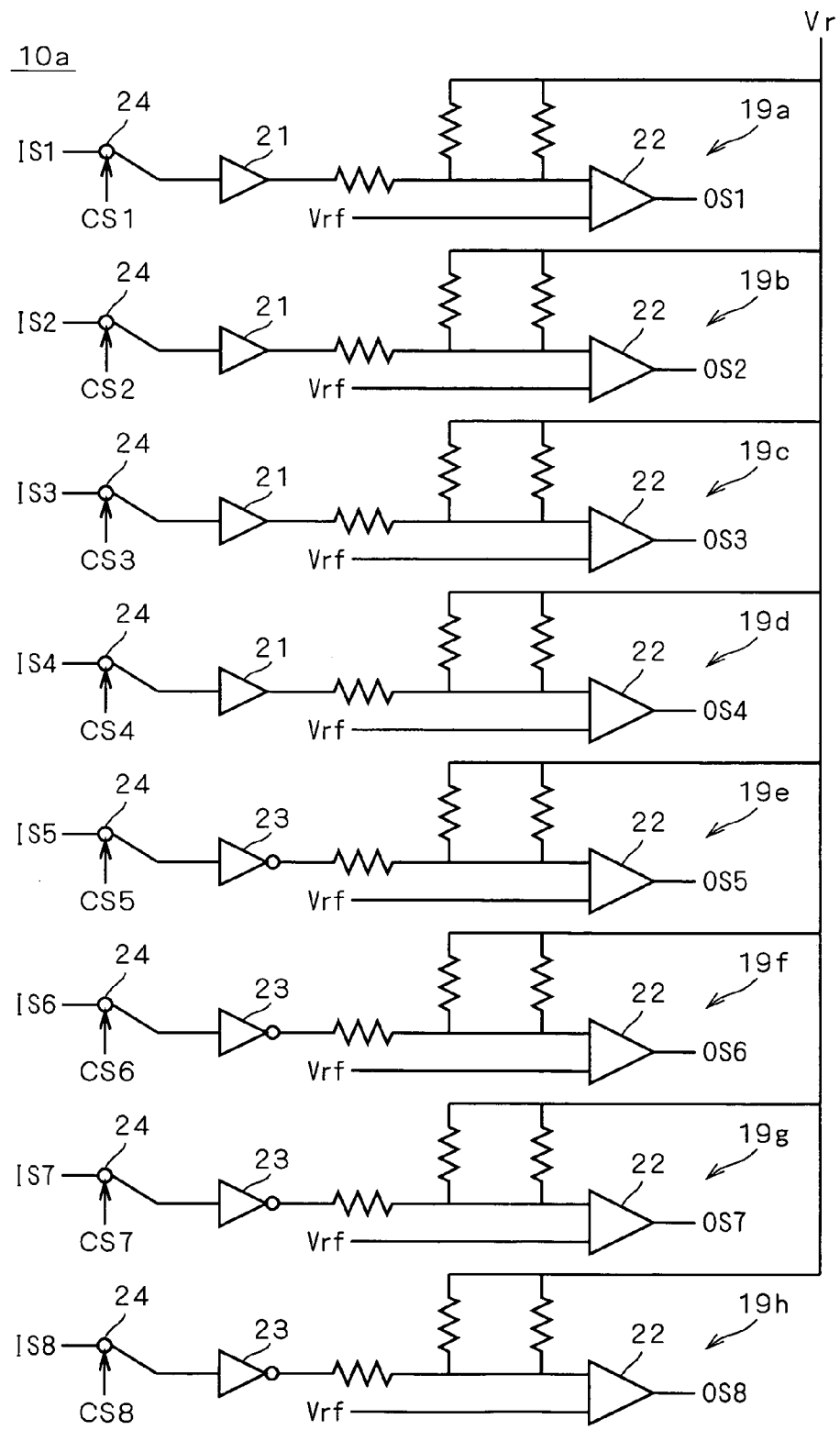
FIG. 6 is a diagram showing an interface circuit device in a case where one pixel is represented by four bits in the second preferred embodiment.

FIG. 6 is a diagram showing the interface circuit device 10a in a case where one pixel is represented by four bits in the second preferred embodiment. FIG. 6 shows only the elements connected to each of the corresponding circuits by the switching element 24.

Based on the captured bit number (four bits) representing one pixel, the CPU 7 sets a low level to the signals CS1 to CS4, and a high level to the signals CS5 to CS8.

Thereby, each of the switching elements 24 of SSTL circuits 19a to 19d connects the non-inverting element 21 to the circuit. As a result, the SSTL circuits 19a to 19d become circuits equivalent to the SSTL circuits 11 to 14 in the first preferred embodiment, respectively.

On the other hand, each of the switching elements 24 of SSTL circuits 19e to 19h connects the inverting element 23 to the circuit. As a result, the SSTL circuits 19e to 19h become circuits equivalent to the SSTL circuits 15 to 18 in the first preferred embodiment, respectively.

Hence, in the case of using the interface circuit device 10a of the second preferred embodiment, only the polarities of the signals IS5 to IS8 that represent the pixel P2 are inverted, as in the first preferred embodiment. It is therefore possible to comply with the case where one pixel is represented by four bits.

Figure 7:
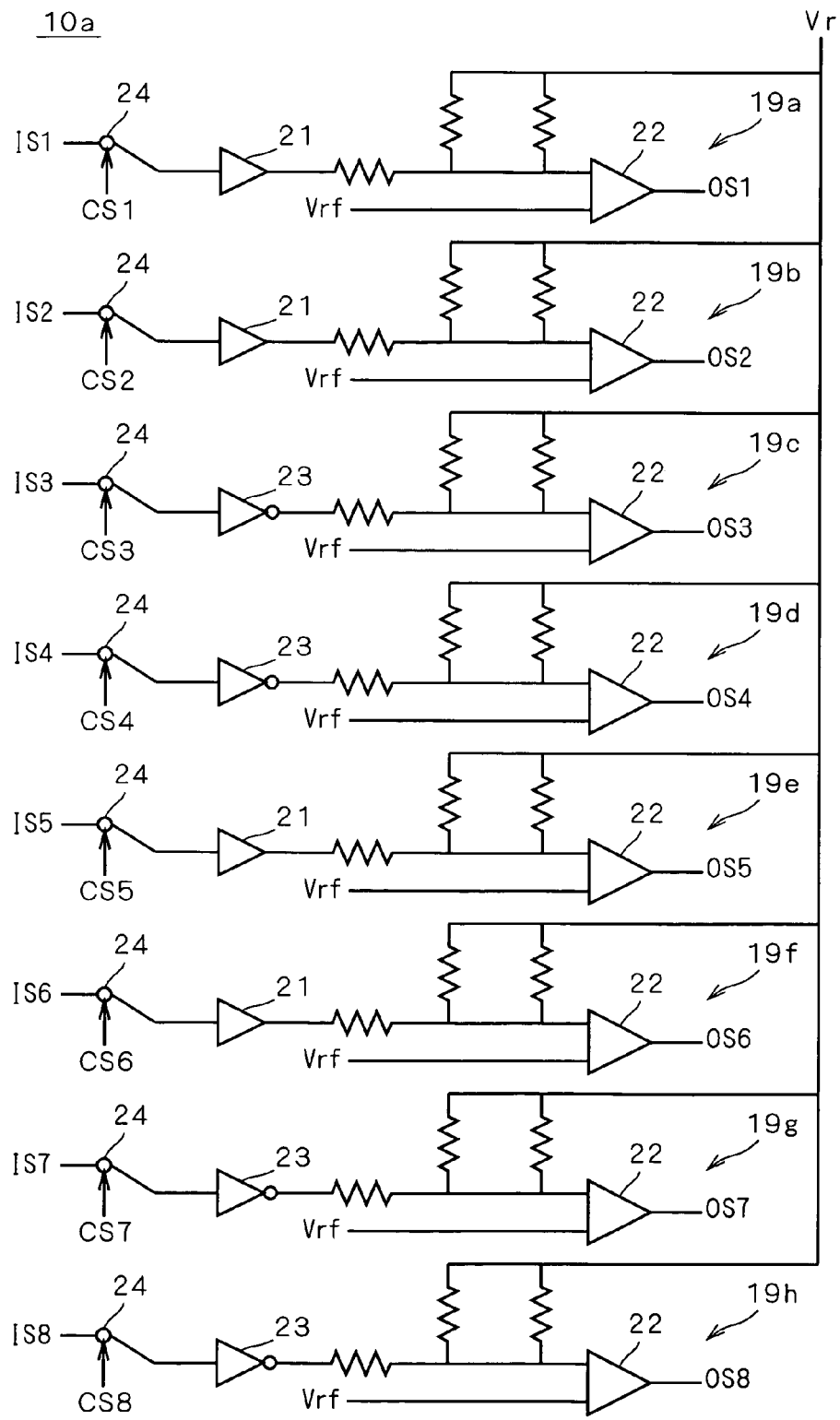
FIG. 7 is a diagram showing an interface circuit device in a case where one pixel is represented by two bits in the second preferred embodiment.

FIG. 7 is a diagram showing the interface circuit device 10a in a case where one pixel is represented by two bits in the second preferred embodiment. FIG. 7 shows only the elements connected to each of the corresponding circuits by the switching element 24.

When one pixel is represented by two bits, the signals representing two adjoining pixels correspond to four bits. Accordingly, one unit block of this case is made up of four SSTL circuits.

That is, the signals representing the pixel P1 are the signals IS1 and IS2, and the signals representing the pixel P2 are the signals IS3 and IS4. Similarly, the signals representing the pixel P3 are the signals IS5 and IS6, and the signals representing the pixel P4 are the signals IS7 and IS8.

The pixels sequentially scanned in the line data of the image data 80 are the pixels P1, P2, P3, and P4. Therefore, in a case where these pixels are alternately changed into an inverted pixel, the pixels P2 and P4 correspond to pixels to be inverted.

Based on the captured bit number (two bits) representing one pixel, the CPU 7 determines the SSTL circuits, to which the signals representing the pixels to be inverted are inputted, and then outputs the signals CS1 to CS8.

In the following example, signals CS1, CS2, CS5, and CS6, each of which is set to a low level, are outputted to the SSTL circuits, to which signals representing pixels not to be inverted (the pixels P1, P3) are inputted. On the other hand, signals CS3, CS4, CS7, and CS8, each of which is set to a high level, are outputted to the SSTL circuits, to which signals representing the pixels to be inverted (the pixels P2, P4) are inputted.

Thus, each of the switching elements 24 of the SSTL circuits 19a, 19b, 19e, and 19f connects the non-inverting element 21 to each of the corresponding circuits. As a result, the SSTL circuits 19a, 19b, 19e, and 19f become circuits equivalent to the SSTL circuits 11 to 14 in the first preferred embodiment.

On the other hand, each of the switching elements 24 of the SSTL circuits 19c, 19d, 19g, and 19h connects the inverting element 23 to each of the corresponding circuits. As a result, the SSTL circuits 19c, 19d, 19g, and 19h become circuits equivalent to the SSTL circuits 15 to 18 in the first preferred embodiment.

That is, even if one pixel is represented by two bits, the polarity of only the signal representing one of two adjoining pixels can be inverted.

Thus, in the printing apparatus 1 of the second preferred embodiment, the SSTL circuits 19a to 19h have their respective corresponding inverting elements 23, and the CPU 7 controls the switching elements 24, making it possible to comply with the cases where one pixel is represented by various bit numbers.

Additionally, the interface circuit device 10a of the printing apparatus 1 in the second preferred embodiment can be realized by the SSTL circuits 19a to 19h of the same construction. This improves mass production effect.

The second preferred embodiment has described the case where the CPU 7 controls the switching elements 24 so as to perform the element switching in hardware manner. However, the technique of complying with variation in the bit number representing one pixel should not be limited to this.

Figure 8:
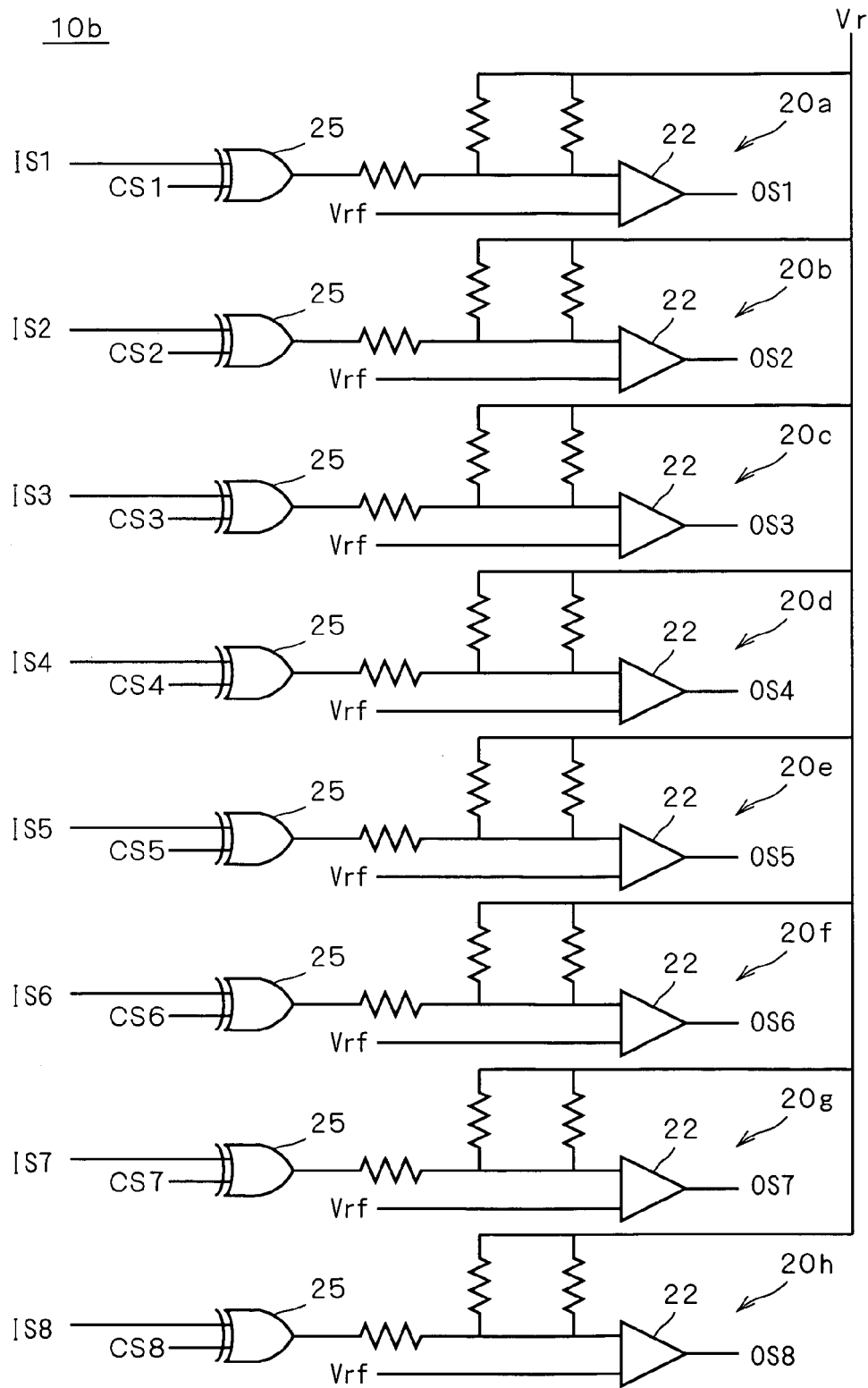
FIG. 8 is a diagram showing an interface circuit device of a printing apparatus in a third preferred embodiment.
Figure 9:
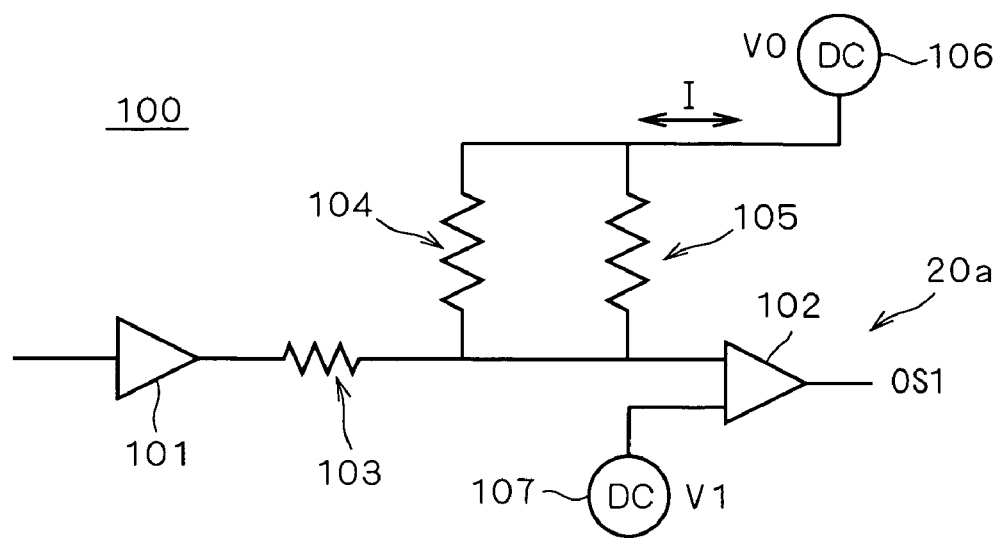
FIG. 9 is a circuit diagram showing a conventional SSTL circuit.

FIG. 8 is a diagram showing an interface circuit device 10b of a printing apparatus 1 in a third preferred embodiment. The printing apparatus 1 of the third preferred embodiment is the same as the printing apparatus 1 of the second preferred embodiment, except for the interface circuit device 10b.

The interface circuit device 10b has a plurality of SSTL circuits 20a to 20h. Each of the SSTL circuits 20a to 20h can be obtained by replacing the non-inverting element 21, the inverting element 23, and the switching element 24 of the SSTL circuits 19a to 19h in the second preferred embodiment, with logical elements 25.

Each of the logical elements 25 is a so-called Ex. OR element (a different signal detecting element). The logical element 25 outputs a high level when two different signals are input, and outputs a low level when two identical signals are input. The operation of the logical element 25 will be described hereinafter specifically.

When an input signal IS representing a pixel not to be inverted (e.g., the pixel P1) is inputted, it is necessary to prevent the SSTL circuit from inverting the input signal IS. To prevent the input signal IS from being inverted by the SSTL circuit, the CPU 7 inputs a control signal CS of a low level into the logical element 25. In this case, when the input signal IS is in a low level, the control signal CS and the input signal IS are identical, so that the low level is outputted from the logical element 25. When the input signal IS is in a high level, the control signal CS and the input signal IS are different, so that the high level is outputted from the logical element 25. That is, the input signal IS, without being inverted, is outputted as it is from the logical element 25.

On the other hand, when an input signal IS representing a pixel to be inverted (e.g., the pixel P2) is inputted, it is necessary to control the SSTL circuit so as to invert the input signal IS. In order to control the SSTL circuit so as to invert the input signal IS, the CPU 7 inputs a control signal CS of a high level into the logical element 25. In this case, when the input signal IS is in a low level, the control signal CS and the input signal IS are different, so that the high level is outputted from the logical element 25. When the input signal IS is in a high level, the control signal CS and the input signal IS are identical, so that the low level is outputted from the logical element 25. That is, the input signal IS is inverted and outputted from the logical element 25.

Accordingly, the output S from the logical elements 25 can be controlled by the control signals CS1 to CS8 from the CPU 7, so that the interface circuit device 10b of the printing apparatus 1 in the third preferred embodiment can produce the same effect as the second preferred embodiment.

In the foregoing embodiments, a series of sequential pixels are alternately inverted in their polarities. That is, in the case where the pixels P1, P2, P3, and P4 are sequentially scanned, and the pixels P1, P2, P3, and P4 are handled as one unit block, the pixels P2 and P4 are inverted in their polarities. However, one of two adjoining pixels on one unit block may at least be inverted, in other words, a series of sequential pixels are not necessarily inverted alternately. For example, in the above described case, the pixels P2 and P3 may be inverted in their polarities. In this case, again, the same effect as the first through third preferred embodiments can be produced.

The direction of scanning of two adjoining pixels is not limited to a linear direction. For example, two adjoining pixels may be objects of a curvilinear scanning. That is, signals inputted to one unit block may be signals that represent the two adjoining pixels in the image data 80, and no limitations are imposed on the direction in which two pixels adjoin to each other.

While the invention has been shown and described in detail, the foregoing description is in all aspects illustrative and not restrictive. It is therefore understood that numerous modifications and variations can be devised without departing from the scope of the invention.

What is claimed is:

1. An interface circuit device to perform input/output of a signal representing image data, comprising:
   a CPU,
   a plurality of buses for wiring said CPU and an image memory;
   a plurality of SSTL (stub series terminated logic) circuits each of which are provided corresponding to each of said plurality of buses; and
   a reference power apparatus for applying a reference voltage to each of said plurality of SSTL circuits,
   each of said plurality of SSTL circuits having:
      a receiver for comparing:
         i) an input voltage obtained based on an input signal inputted to a corresponding bus and said reference voltage; and
         ii) a comparison voltage, and
         outputting an output signal corresponding to a comparison result to said image memory; and
      a resistance for electrically connecting said reference power apparatus and a location between said receiver and said CPU on a corresponding bus, and
   when a SSTL circuit corresponding to said image data among said plurality of SSTL circuits is classified pixel by pixel constituting said image data, one or more SSTL circuits corresponding to either one of two adjoining pixels are provided on the input side, and have an inverting element for inverting said input signal and changing a corresponding pixel into an inverted pixel.

2. The interface circuit device according to claim 1 wherein,
   each of said plurality of SSTL circuits has
   a signal inverting element for inverting said input signal corresponding to a control signal from said CPU as said inverting element,
   said CPU is configured to acquire a bit number constituting one pixel; and
   based on the bit number acquired, specify a SSTL circuit to which an input signal representing the pixel to be inverted is inputted from the plurality of SSTL circuits, and allows to transmit said control signal only to a signal inverting element corresponding to the SSTL circuit specified to invert an input signal.

3. The interface circuit device according to claim 1 wherein the plurality of pixels represent one line of the image data.

4. The interface circuit device according to claim 1 wherein the plurality of SSTL circuits alternately inverts an input signal representing a plurality of sequential pixels in the predetermined scanning direction.

5. The interface circuit device according to claim 1 wherein the two pixels are adjoining in the predetermined scanning direction of the image data.

6. The interface circuit device according to claim 1 wherein the two pixels are adjoining in a direction of crossing in the predetermined scanning direction.

7. A printing apparatus comprising:
a printing part for printing an image on paper based on image data; and
an interface circuit device for performing input-output of a signal representing image data, wherein,
the interface circuit device comprises:
a CPU,
a plurality of buses for wiring said CPU and an image memory;
a plurality of SSTL (stub series terminated logic) circuits each of which are provided corresponding to each of said plurality of buses; and
a reference power apparatus for applying a reference voltage to each of said plurality of SSTL circuits,
each of said plurality of SSTL circuits having:
a receiver for comparing:
i) an input voltage obtained based on an input signal inputted to a corresponding bus and said reference voltage; and
ii) a comparison voltage, and
outputting an output signal corresponding to a comparison result to said image memory; and
a resistance for electrically connecting said reference power apparatus and a location between said receiver and said CPU on a corresponding bus, and
when a SSTL circuit corresponding to said image data among said plurality of SSTL circuits is classified pixel by pixel constituting said image data, one or more SSTL circuits corresponding to either one of two adjoining pixels are provided on the input side, and have an inverting element for inverting said input signal and changing a corresponding pixel into an inverted pixel.

* * * * *